No. 711,730.  
A. A. METHVEN.  
ROTARY ENGINE.  
(Application filed Mar. 19, 1900.)  
(No Model.)  
Patented Oct. 21, 1902.  
2 Sheets—Sheet 1.
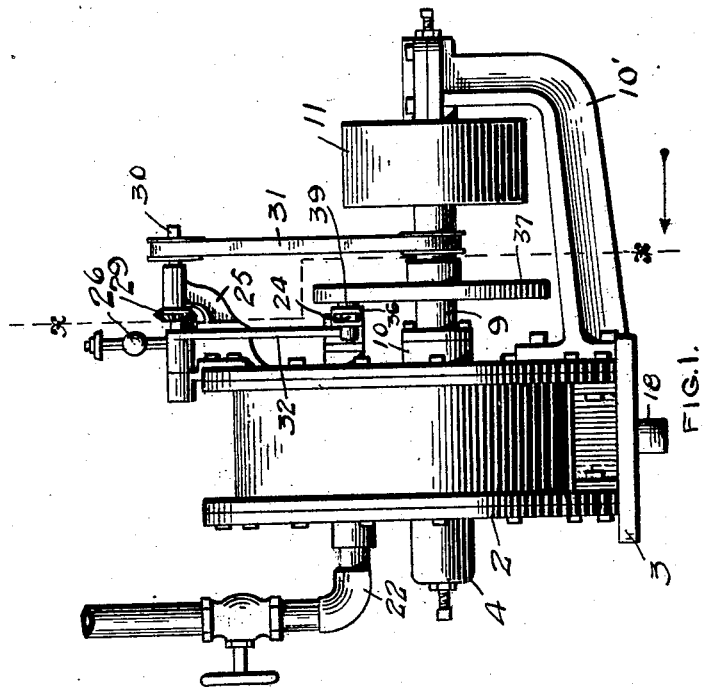
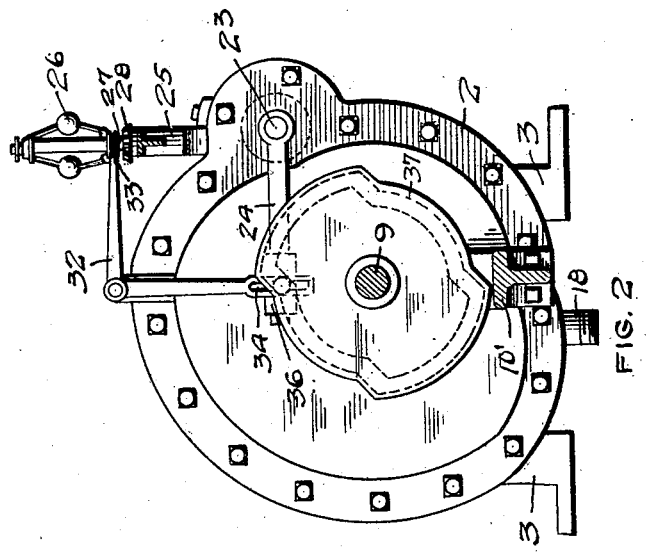
WITNESSES  
INVENTOR  
ANGUS A. METHVEN  
BY  
HIS ATTORNEYS.

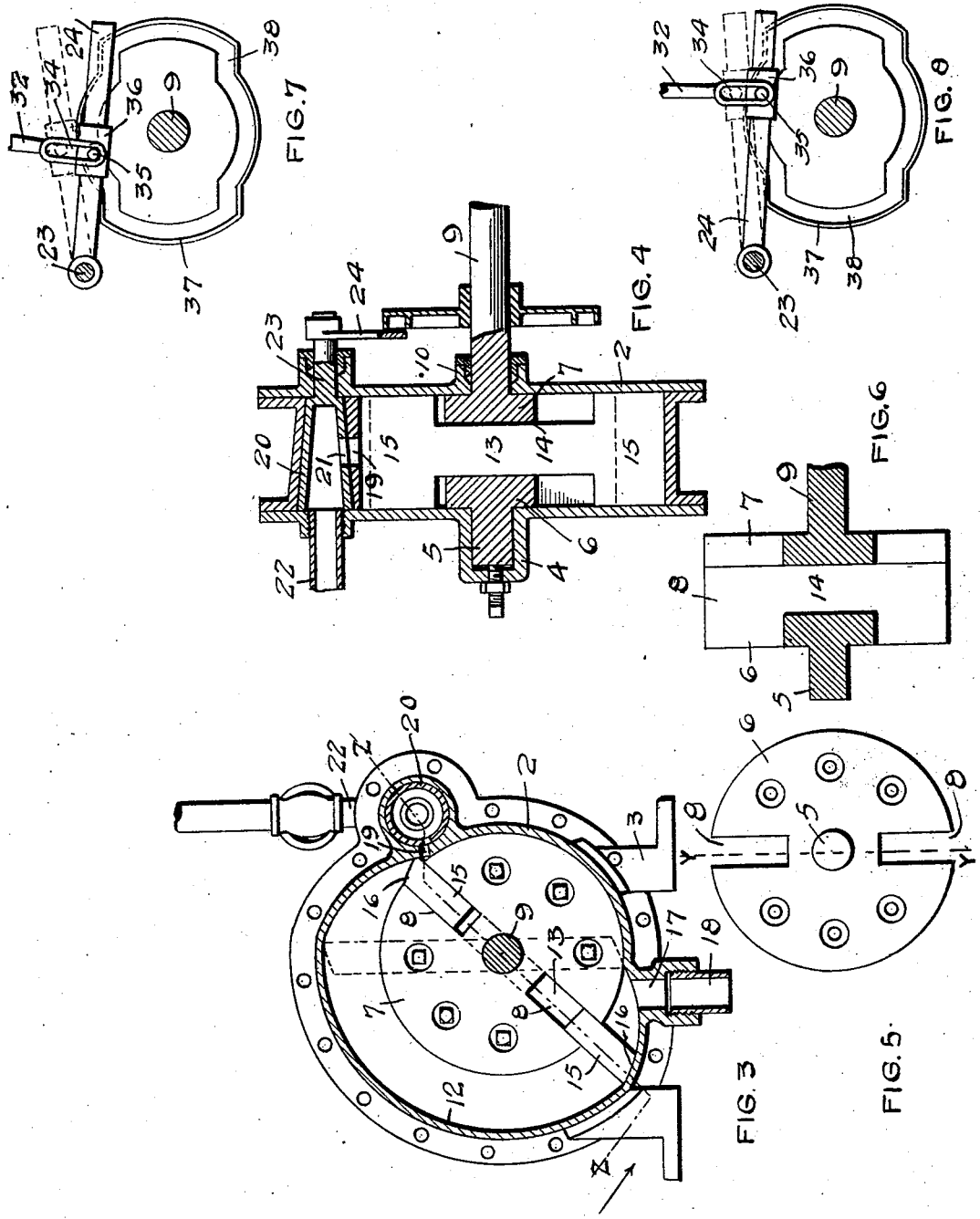

UNITED STATES PATENT OFFICE.

ANGUS A. METHVEN, OF MINNEAPOLIS, MINNESOTA.

ROTARY ENGINE.

SPECIFICATION forming part of Letters Patent No. 711,730, dated October 21, 1902.

Application filed March 19, 1900. Serial No. 9,181. (No model.)

*To all whom it may concern:*

Be it known that I, ANGUS A. METHVEN, of Minneapolis, Hennepin county, Minnesota, have invented certain new and useful Improvements in Rotary Engines, of which the following is a specification.

The invention relates to engines of the rotary type; and the primary object of the invention is to dispense with all springs in connection with the revolving piston and provide an engine wherein the expansive force or power of the steam admitted thereto is fully utilized.

A further object is to provide an engine wherein the admission of steam is automatically controlled by the speed of the engine.

A further object is to provide a rotary engine that is also adapted for use as a water-motor and, with slight modifications, as a pump.

The invention consists generally in various constructions and combinations, all as hereinafter described, and particularly pointed out in the claims.

In the accompanying drawings, forming part of this specification, Figure 1 is a side elevation of a rotary engine embodying my invention. Fig. 2 is a sectional view on the line *x x* of Fig. 1. Fig. 3 is a vertical section showing the interior of the cylinder and the piston therein. Fig. 4 is a sectional view on the line *z z* of Fig. 3. Fig. 5 is an end view of the piston. Fig. 6 is a sectional view on the line *y y* of Fig. 5. Fig. 7 is a detail of the mechanism for controlling the supply of steam to the cylinder. Fig. 8 is a similar view of the same part standing in a different position.

In the drawings, 2 represents the cylinder, supported upon suitable legs or standards 3 and having in one head the bearing-box 4 to receive the end of the trunnion or stub-shaft 5, provided on one section or member 6 of the piston. The other section or member 7 of the piston corresponds to the member 6 and is secured thereto by bolts, as shown in Fig. 5, or in any other suitable way, and both members are provided with radial slots 8, which register and are adapted to receive the sliding wing member, hereinafter described. The section 7 of the piston is provided with a shaft 9, extending through a stuffing-box 10 in the head of the cylinder, and projects for a considerable distance beyond said head and is supported at its outer end in bearings on a bracket 10. Near the outer end of said shaft I prefer to provide a driving-pulley 11.

The members or sections of the piston are preferably disk-like in form, and the piston is mounted eccentrically within the cylinder, as shown in Fig. 3, and is adapted to slide or roll therein, bearing upon a small section or portion only of the inner surface of the cylinder, which, as shown, is provided with an irregular track or cam-surface 12. Within the piston I prefer to provide a sliding wing section or member having a shank 13 slidable in a slot 14 between the radial slots 8, said shank being provided at each end with wings 15, that are slidable in the slots 8 and reciprocate therein as the piston is revolved. The heads have beveled ends 16, which engage the cam-surface of the cylinder and slide over the same and are alternately moved in and out within the slots 8 as the piston rolls or revolves within the cylinder. The wing member forms a close sliding joint with the sections of the piston, so that the steam cannot pass through the piston from one side to the other. The cylinder, although having an inner irregular or cam surface over which the ends of the sliding wing travels, is nevertheless of substantially the same diameter at all points, and consequently an equal portion of the wing or plate surface will be exposed to the pressure of the steam at all points of its travel, and the stroke of the piston will thereby be rendered smooth and regular. In the lower wall of the cylinder I provide an exhaust-port 17, leading to an exhaust-pipe 18, and in the side wall of the cylinder I provide a steam-inlet port 19 and a conical valve 20, having a reciprocating or rocking movement on its seat. This valve is preferably hollow and provided with a port 21, adapted to register with the port 19 and is open at one end to communicate with the steam-supply pipe 22. The valve being conical in form, the pressure of steam within its interior will hold it firmly against the walls of the valve-casing and prevent the leakage of steam around the valve-stem or into the cylinder through the inlet-port when the valve is closed. The valve-stem 23 projects through a suitable packing-box and is provided with an arm or lever 24. When the valve is turned so that the port therein will register with the inlet-port of the cylinder, the steam rushing in will engage the projecting wing on the upper side of the piston and set the engine in motion. As the wing member will slide for a considerable distance over the surface of the cylinder before reaching the exhaust-port the full expansive force of the steam will be utilized and a considerable economy effected in the operation of the engine. As soon as the protruding end or head of the wing member has passed the exhaust-port it will engage that portion of the surface upon which the piston bears and be thrust thereby back into its socket in the piston, while the opposite end of the wing member will be projected a corresponding distance on the opposite side of the piston.

From the construction of the valve it will be noted that each time it is rocked the steam will be alternately admitted into the cylinder and cut off therefrom, and I arrange the inlet-port and the valve-port registering therewith, so that both ports will be open to admit steam when the wing member has passed the inlet-port on its upstroke and is in position to be engaged and driven forward by the pressure of the incoming steam.

On one head of the cylinder I provide a bracket 25, supporting a centrifugal governor 26, the stem 27 of which is provided with a beveled pinion 28, engaging a similar pinion 29 on a horizontal shaft 30, also preferably supported on said bracket. The shaft 30 is driven by a belt 31 from the driving-shaft 9.

In order that the supply of steam to the engine, and hence its speed, may be regulated, I prefer to provide a bell-crank 32, pivoted on the cylinder and having one arm in engagement with a grooved wing 33 on the governor-stem and its other arm provided with a longitudinal slot 34 to receive a pin 35, provided on a block 36, that is slidably arranged on the arm or lever 24. On the driving-shaft 9 I provide a disk or plate 37, having in its surface an irregular or cam track 38, wherein an antifriction-roller 39 on the block 36 is adapted to travel.

As shown in Figs. 7 and 8, the track 38 is the same upon each side of the plate 37, so that the steam-valve will be rocked the same distance from each end of the sliding wing with each revolution of the piston. The full lines in Fig. 7 represent the position of the lever 24 when the valve is closed and the dotted lines represent the position of the lever when the valve is open and the position of the sliding block on said lever regulates the movement or stroke of the valve, and hence the volume of steam that is admitted to the cylinder. If the speed of the engine is increased beyond the desired number of revolutions—as, for instance, when the engine is relieved of its load—the governor will slide the ring 33 down on the governor-stem and, through the medium of the bell-crank 32, slide the block toward the outer end of the lever 24, so that the revolution of the plate 37 will only partially open the steam-valve, and thus decrease the volume of steam admitted to the cylinder. If the speed of the engine drops below the desired point, the sliding block will be moved in on the lever 24 and the movement of the lever and valve will be correspondingly increased, opening the inlet-port wider and allowing more steam to enter the cylinder. When the roller 39 enters the curved regular portion of the track at the end of the plate 37, the lever 24 will be raised to the position indicated by dotted lines in Fig. 7, should the sliding block be in the position on said lever as indicated in said figure.

If the speed of the engine has risen above the desired limit, the sliding block will be near the outer end of the lever 24, as shown in Fig. 8, the valve will be partially opened only, and when closed the lever 24 will be in the position indicated by dotted lines in said figure. The supply of steam to the cylinder is thus automatically controlled by the speed of the engine, which is of course commensurate to the work it has to do—that is, if the engine is working under a heavy load a greater volume of steam will be admitted to the cylinder to keep up the speed of the re-revolving piston and when the engine is relieved of its load the steam will be gradually cut off and racing of the engine prevented.

While I have shown and described the device as adapted for use as a steam-engine, it may be used as a water-motor with equally good results.

When the apparatus is used as a water-motor, I may dispense with the valve controlling the admission of water or steam into the cylinder, providing, however, some suitable device for controlling the water-supply. The cut-off device that is connected with the governor may, of course, be dispensed with.

I may prefer to provide a cylinder of substantially double the width of the one shown herein and provide a piston correspondingly increased in width or thickness and having duplicate wings or sliding plates that operate in the same direction alternately—that is, when one wing engages the wall of the cylinder and slides in one direction the other wing will engage the opposite wall and slide in the other direction. The two wings will thus balance each other and cause the engine to run easily and smoothly, eliminating all jarring and shaking that is incident to the use of a single sliding wing. I regard this construction as a duplication of what I have already shown and do not, therefore, consider an illustration necessary.

The apparatus may be readily adapted for use as a pump, in which case I should prefer to use the exhaust-port as an inlet and the present inlet-port as an outlet, making it considerably larger than the inlet. I may also prefer to increase the number of wings, providing an additional one in the piston substantially at right angles to the one shown and described herein. The details of construction which I have shown may be modified in various ways without departing from my invention.

Having thus described my invention, I claim as new and desire to secure by Letters Patent—

1. The combination, with the cylinder having inlet and exhaust ports, of a revolving piston arranged therein, a cam plate or disk mounted upon said shaft, a conical valve having a port adapted to register with said inlet-port, an arm or lever provided on the stem of said valve, a block slidable on said arm and having a roller adapted to travel on said cam-plate, a centrifugal governor and means connecting said governor and said sliding block, whereby the movement of said valve is regulated and the steam passing through said inlet-port controlled, substantially as described.

2. In a rotary engine, the combination, with a cylinder, of a piston therein, a shaft therefor, a valve adapted to control the admission of steam to said cylinder, a disk connected with said shaft and having an irregular path or track, a lever connected with said valve, a roller adapted to travel in the path on said disk and having a sliding connection with said lever, and a centrifugal governor for controlling the movement of said roller with respect to said lever and thereby regulating the operation of said valve and the admission of steam to said cylinder, substantially as described.

3. The combination, with a cylinder having inlet and outlet ports, of a revolving piston arranged therein, a shaft therefor, a cam plate or disk mounted upon said shaft, a rotary valve adapted to control the admission of steam to said cylinder, a lever provided on the stem of said valve, a block slidable on said lever, a suitable connection provided between said block and said cam-plate, a centrifugal governor, and means connecting said governor and said block, whereby as the speed increases or decreases said block will be moved along said lever and the valve closed or opened, substantially as described.

4. The combination, with a cylinder, having an inlet-port 19 and an exhaust-port 17, of a rotary valve 20 adapted to close said inlet-port, means for automatically operating said valve to close or open said port, a piston provided in said cylinder and comprising two sections or members, said sections having radial slots and an intermediate communicating slot, a single wing member or section having a shank portion to slide in said communicating slot and head members to slide in said radial slots and alternately engage the walls of said cylinder, substantially as described.

5. In a rotary engine, the combination, with a cylinder, of a piston therein, a shaft therefor, a rotary valve adapted to control the admission of steam to said cylinder, a disk provided on said shaft and having a cam track or path on its surface, a lever provided on the stem of said valve, a block slidable thereon and engaging said cam-track, a centrifugal governor, and means connecting said governor and said block whereby the admission of steam to said cylinder may be automatically regulated, substantially as described.

6. The combination, with a cylinder having inlet and exhaust ports, of a revolving piston within said cylinder having communicating radial slots in its opposite sides, a wing member or section slidably arranged in said slots and adapted to alternately engage the walls of said cylinder, a rotary cut-off valve for regulating the admission of steam through said inlet-port, a lever provided on the stem of said valve, a block slidable on said lever, and a centrifugal-governor mechanism connected with said block, whereby as the speed increases or decreases said block will be moved along said lever and said cut-off valve opened or closed.

7. The combination, with a cylinder having inlet and exhaust ports, of a revolving piston within said cylinder, a wing member or section slidably arranged in slots in said piston and having ends adapted to alternately engage the walls of said cylinder, a rotary cut-off valve for controlling the admission of steam through said inlet-port, a lever for said valve, a cam-disk provided on the shaft of said piston, a roller adapted to travel on said disk and having a sliding connection with said lever, and a centrifugal governor for controlling the movement of said roller with respect to said lever, thereby regulating the operation of said valve and the admission of steam to said cylinder.

In witness whereof I have hereunto set my hand this 15th day of March, 1900.

ANGUS A. METHVEN.

In presence of—
RICHARD PAUL,
M. C. NOONAN.